May 12, 1931.  C. BREER  1,805,357
VIBRATION DAMPENER
Filed Jan. 24, 1927
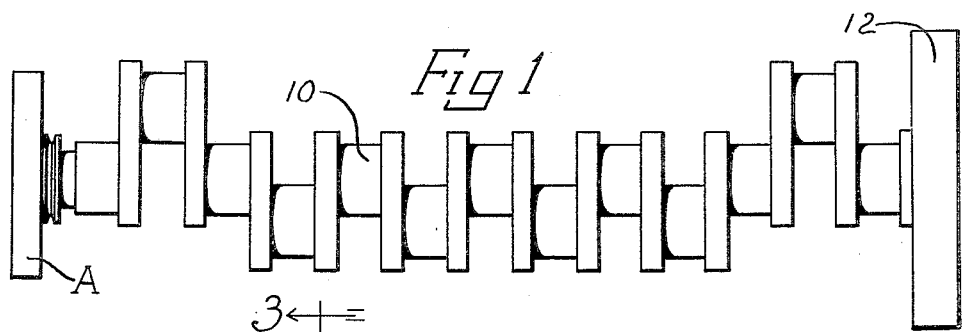
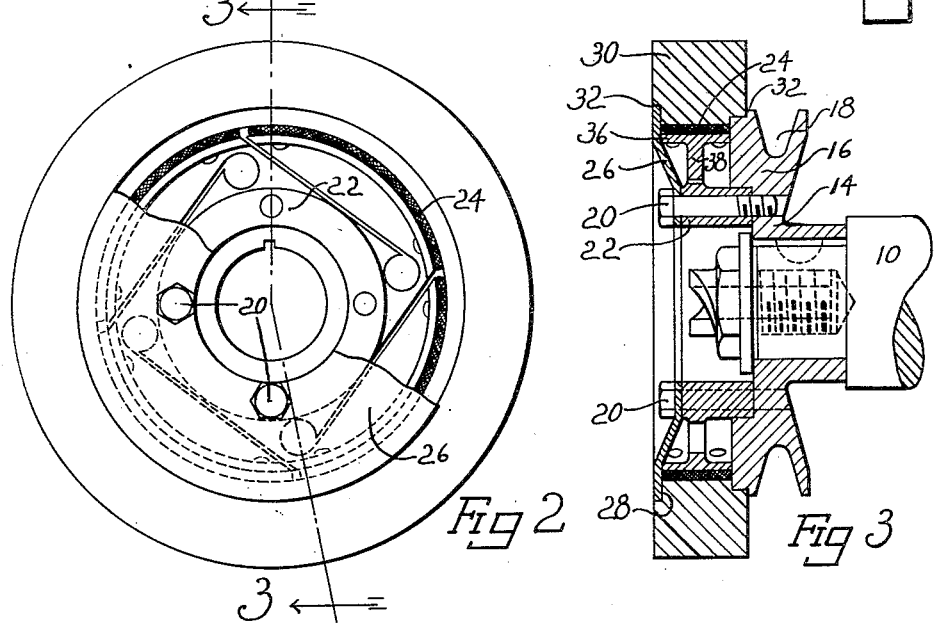
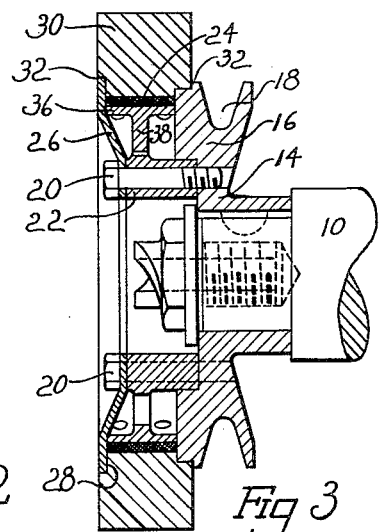
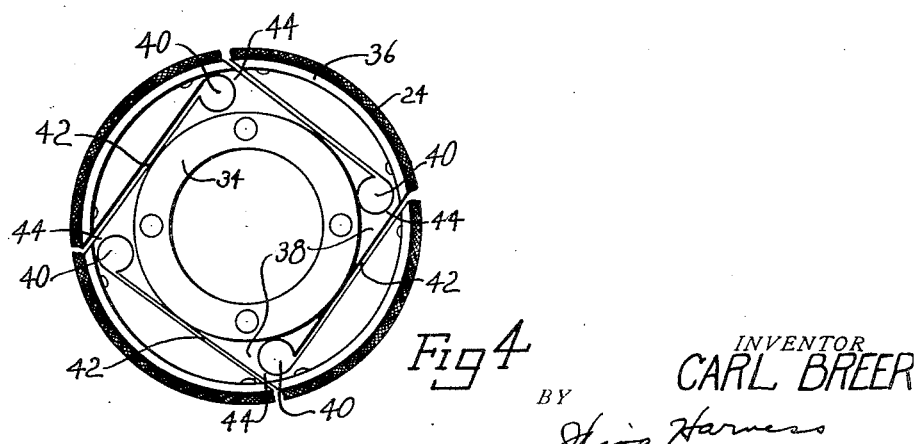
INVENTOR
CARL BREER
BY
ATTORNEY Patented May 12, 1931

1,805,357

UNITED STATES PATENT OFFICE

CARL BREER, OF DETROIT, MICHIGAN, ASSIGNOR TO CHRYSLER CORPORATION, OF HIGHLAND PARK, MICHIGAN, A CORPORATION OF DELAWARE

VIBRATION DAMPENER

Application filed January 24, 1927. Serial No. 163,117.

This invention relates to internal combustion engines and more particularly to torsional vibration dampening means for eliminating certain torsional vibration in the running of crankshafts of multicylinder engines used in motor vehicles.

Heretofore, the practice has been to provide a slipping ring on the crankshaft designed to eliminate vibration at a particular speed but this is not entirely satisfactory for all periods of vibration.

An important object of the invention is to provide a dampener in which a slipping inertia ring is frictionally engaged and rotated by the crankshaft and the amount of frictional grip is varied in proportion to the speed of the crankshaft.

Another object of the invention is to provide frictional engaging surfaces which are centrifugally urged into frictional engagement with an inertia member to cause the latter to rotate therewith.

A further object of the invention is to provide a vibration dampening device of simple and economical construction and one which operates to dampen all periods of vibration.

Other objects will more fully appear from the following description taken in connection with the accompanying drawings in which:

Fig. 1 is a side elevation of a crankshaft and flywheel embodying the invention.

Fig. 2 is an end view of the dampener, parts being broken away.

Fig. 3 is a sectional view taken on line 3—3 of Fig. 2.

Fig. 4 is a side elevation of the driving member.

Referring to an illustrated embodiment of my invention, a crankshaft 10 has been shown provided with a flywheel 12 at one end thereof and a dampener A at the other end thereof.

The dampener A comprises a hub member 14 which is keyed to the crankshaft 10 and provided with a radial integral flange 16 which has been shown grooved as at 18 forming the fan belt pulley. Laterally secured to the hub 14, such as by bolts 20, is a friction ring 22 having its outer periphery provided with a lining 24 and a retaining member 26 is secured to the ring 22, to rotate therewith, shown as secured by the bolts 20. The retaining member 26 extends radially beyond the outer periphery of the friciton ring 22 and, together with the flange 16, which also extends radially beyond the outer periphery of the friction ring 22, forms an annular groove 28. An inertia ring 30 is rotatably mounted in the groove 28 with its inner periphery adjacent to or in frictional engagement with the friction ring 22, it being supported as at 32 by the radially extending flange of the retaining member and the flange 16.

The friction ring 22 as illustrated consists of an inner ring 34 and an outer ring 36, spaced by a web 38. Openings 40 are formed in the web 38 and a saw cut or slot 42 is formed in the outer ring 36, adjacent one opening through the web 38, to another opening thus forming the outer ring 36 into segmental sections joined together only by a small section of the web 38 as indicated at 44. It will be understood that the inner ring 34 is rigidly held between the flange 16 and retaining member 26 and that portions of the outer ring are free for radial movement such as caused by the centrifugal force when the parts are rotated. The slotted segmental frictional ring forms in effect a plurality of resilient weighted members which engage the inner periphery of inertia ring 30 with progressingly increased pressure.

At extremely low speeds slight pressure of the segments on the inertia ring is created and the inertia ring 30 is permitted to slip more easily, dampening out the period of vibration for that speed and when a higher speed of rotation is reached another period of vibration is dampened out due to the increased pressure between the rotating member and ring 30, the ring being more tightly held from slipping. As the engine speed increases, the number of torque impulse forces per unit of time likewise increases and consequently, the periodic swing of the crankshaft must increase in amplitude thus making it necessary to increase the friction effect of the dampener so as to more effectively counteract these torsional swings.

While but one form of my invention has been illustrated and described, various modifications may be made without departing from the spirit of my invention and it is not my intention to limit its scope other than by the terms of the appended claims.

What I claim is:

1. In a vibration dampener of the class described, comprising a crankshaft, a radially extending flange rotatable with said crankshaft, a retaining member rotatable with and spaced from said flange to form therebetween an annular grove, a segmental member at the base of said groove adapted for radial expansion by centrifugal force, and an inertia member mounted in the groove with its inner periphery in frictional engagement with the outer periphery of said segmental member.

2. In a vibration dampener of the class described comprising, a crankshaft, a member on said crankshaft provided with an annular groove, a radially expansible member forming the base of said groove, and an inertia member relatively rotatable in said groove with its inner periphery in frictional engagement with said expansible member rendering the amount of friction exerted in said engagement directly proportional to the speed of rotation of the crankshaft.

3. In a vibration dampener of the class described comprising a crankshaft having a flywheel thereon, a member on said crankshaft rotatable therewith and spaced from the flywheel, an inertia ring relatively rotatable on said member, and a radially expansible member rotatable with said member for frictionally engaging with said ring to form a driving connection therebetween.

4. In a vibration dampener of the class described comprising, a crankshaft having a flywheel thereon, a rotatable member spaced from the flywheel and mounted on the crankshaft, an inertia ring supported by said member and relatively rotatable therewith, and a radially expansible member rotatable with said member for frictional engagement with said inertia ring to form a driving connection therebetween.

5. In a vibration dampener of the class described comprising, a crankshaft having a flywheel thereon, a rotatable member spaced from the flywheel and mounted on the crankshaft, an inertia ring supported by said member and relatively rotatable therewith, and a radially expansible member rotatable with said member for circumferential frictional engagement with said inertia ring to form a driving connection therebetween.

6. In a vibration dampener of the class described comprising, a rotatable member, a friction ring secured to said rotatable member having its outer periphery provided with a friction surface broken at intervals by a tangential slot extending through the outer periphery and across said ring to a point adjacent the outer periphery of said ring, and an inertia ring supported adjacent the outer periphery of said friction ring for frictional engagement with said friction ring.

7. In a vibration dampener of the class described comprising, a radial flange, a detachable retaining member spaced from said flange and secured thereto to form an annular groove between them, a radially expansible ring secured between said flange and said retaining member in said annular groove, a friction member around the outer periphery of said ring, and an inertia ring in said groove surrounding and frictionally engaging said friction member to form a driving connection therebetween.

8. In a vibration dampener of the class described comprising, a crankshaft, a fan pulley secured to said crankshaft, a detachable retaining member secured to said pulley, a friction ring secured between said pulley and said retaining member having its outer periphery provided with a friction surface broken at intervals by a tangential slot extending through the outer periphery and across said ring to a point adjacent the outer periphery of said ring, and an inertia ring supported axially by said pulley and detachable flange for frictional engagement with said friction ring whereby said inertia ring is frictionally driven through a varying pressure dependent on the centrifugal force of said friction ring.

CARL BREER.